May 12, 1959  P. C. BROELL  2,886,120
VEHICLE AIR FLOW SYSTEM FOR INCREASING MOTOR
EFFICIENCY AND SETTLING ROAD DEBRIS
Filed Sept. 26, 1955  2 Sheets-Sheet 2
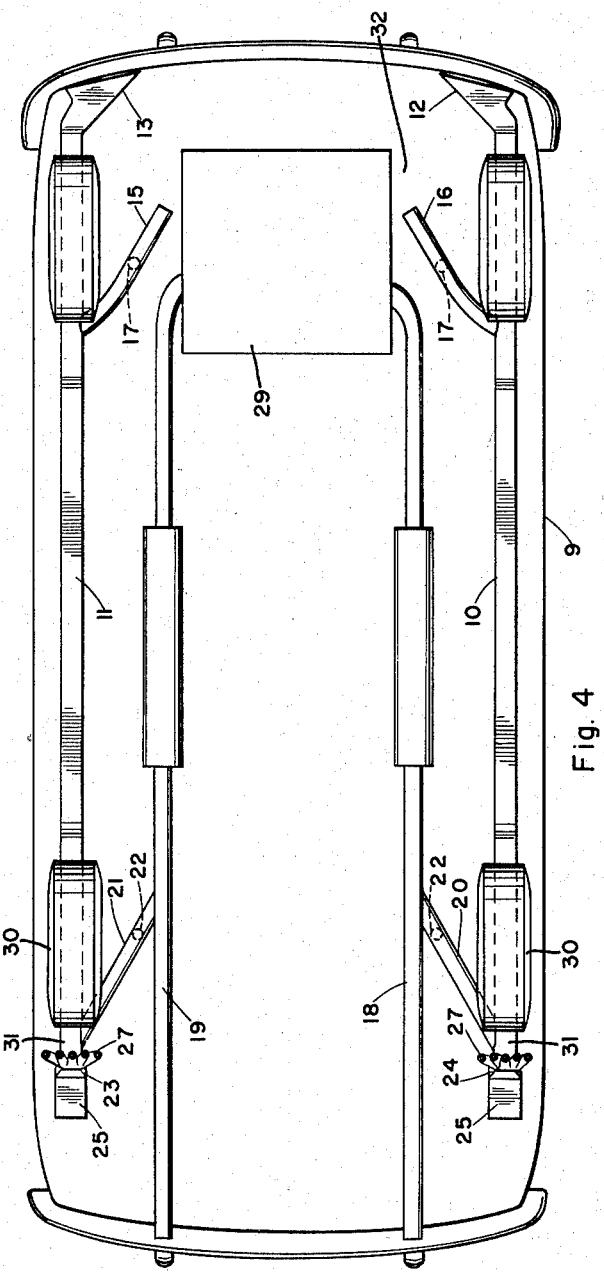
INVENTOR.
PERCY C. BROELL
BY
Knox & Knox

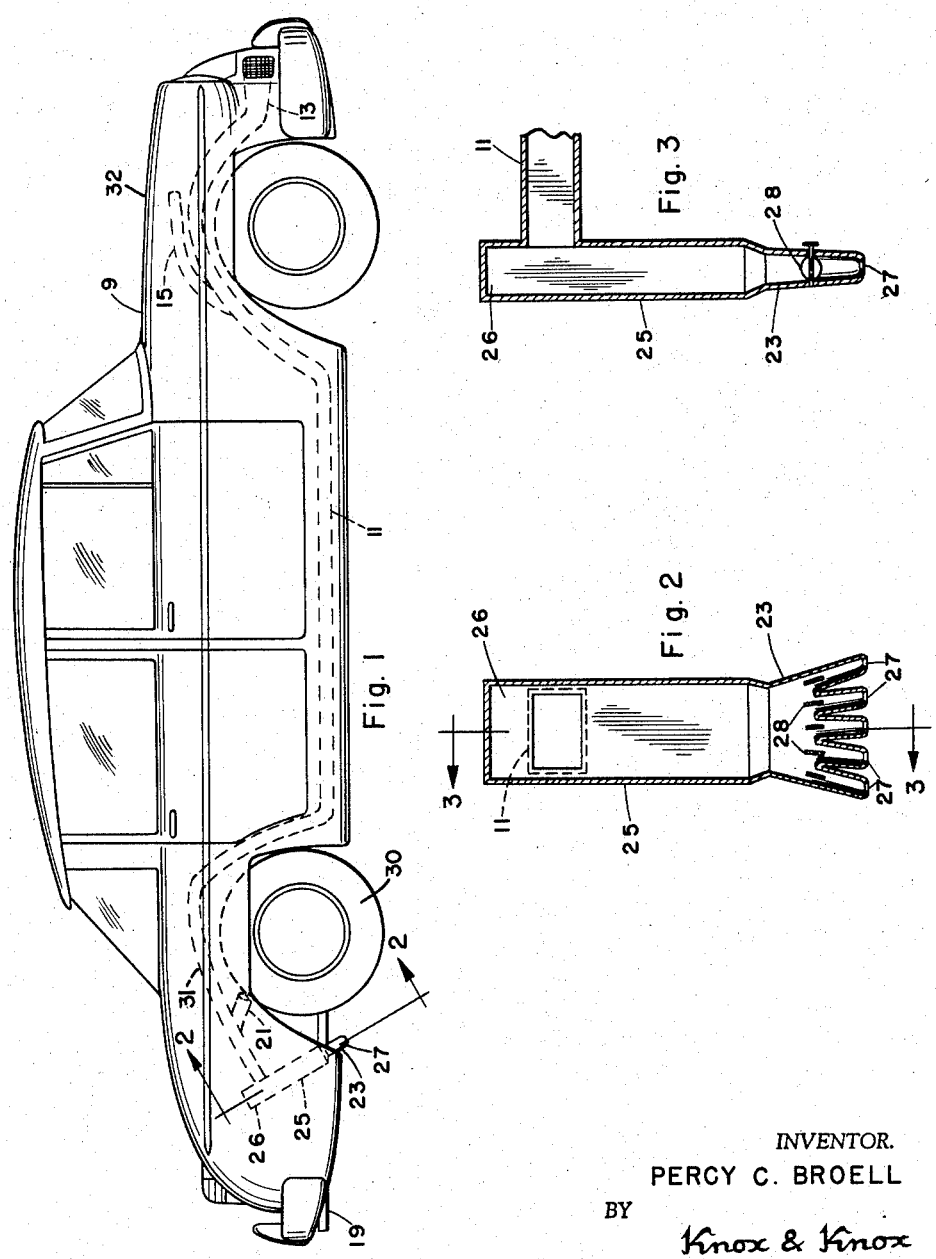

United States Patent Office 2,886,120
Patented May 12, 1959

2,886,120

VEHICLE AIR FLOW SYSTEM FOR INCREASING MOTOR EFFICIENCY AND SETTLING ROAD DEBRIS

Percy C. Broell, San Diego, Calif., assignor of two-fifths to L. L. McCurdy, San Diego, Calif.

Application September 26, 1955, Serial No. 536,619

2 Claims. (Cl. 180—54)

My invention relates to automobile devices and has for its principal object the dissipation of noxious exhaust gases and preventing the rear wheels of the automobile from throwing into the air road oil, mud, dust, water and other road surface material tending to smear the windshields or to obscure the vision of motor vehicles following behind such automobile. According to my invention it is proposed to provide conduits secured to the inner structure of the automobile and leading from ram air intakes at the front of the vehicle, the rear ends of which conduits projecting forwardly and downwardly immediately behind the rear wheels of said automobile near the ground, whereby upon the forward motion of the vehicle air will be rammed into said conduits and caused to flow therethrough and jet downwardly divergingly upon the road so as to settle and hold down dust and other material tending to rise therefrom; and to connect said conduits with the exhaust pipes of the automobile and to divert the noxious gases therefrom to be mixed with and absorbed by the air passing through said conduits and to be discharged therefrom so diluted and dissipated as to lessen smog conditions, the removal of such gases from the said pipes also resulting in the cooler and faster running of the motor.

Attention is hereby directed to the drawing illustrating a preferred form of my invention in which similar reference numerals refer to similar parts throughout the several views, and in which:

Figure 1 is a side elevation view of an automobile showing the position of the air conducting system;

Figure 2 is an enlarged fragmentary sectional view taken on the line 2—2 of Figure 1, showing the rear outlet nozzle;

Figure 3 is a sectional view taken on the line 3—3 of Figure 2; and

Figure 4 is a bottom plan view of the automobile showing the complete system, the automobile being indicated in outline only for clarity.

Referring to the drawings, I have therein shown a conventional form of automobile 9, underneath the fenders and outer portions of the body of which I have secured to the chassis thereof the air flow conduits 10 and 11, extending from the front to the rear of said automobile. At the front the said conduits communicate and are connected with the funnel-shaped ram air intakes 12 and 13 mounted upon the nose of the automobile body, each of said intakes being provided with the wiremeshed insets 14 to guard against the ingress of insects and other obstructive matter, encountered during the forward progress of the automobile. Adjacent to the motor 29, and leading from the motor compartment 32 rearwardly into said conduits at an acute angle thereto, are the motor cooling tubes 15 and 16, each provided with a check valve 17. These tubes 15 and 16 act to cool the motor through removal by diminution of the hot air around the engine thereof by suction created by the fluids passing backwardly through said conduits with which said tubes are connected; the check valve 17 serving by adjustment to regulate the degree of said suction and the amount of said hot air thereby removed. Leading from the exhaust pipes 18 and 19 of the combustion engine of the automobile into the rear portions of said conduits 10 and 11 are the branch exhaust pipes 20 and 21, each having a check valve 22. The purpose of check valve 22, like valve 17, is likewise to produce a cooling effect by regulation of the amount of hot gases sucked out through said exhaust pipes leading from said engines.

Welded or firmly secured to the rear end portions 31 of said conduits and leading downwardly and forwardly therefrom to positions immediately behind and close to the traction of the rear wheels 30 of said automobile, are the jet air flow dispensers 23 and 24, each comprising an open mouthed cylindrical casing 25 with an enlarged chamber portion 26 serving as an air intake pressure accumulator; the passageway of said casing communicating with that of the adjacent conduit, and the bottom of said casing being spread to form the series of divergent jet nozzles 27 leading downwardly therefrom and discharging against the ground immediately to the rear of the wheel adjacent thereto. Preferably a check or regulator valve 28 is supplied for each of said nozzles 27. As will be observed in Figs. 2 and 3, the spread of said nozzles is arranged not only to discharge upon the ground immediately to the rear of said wheel, but also to cover to a substantial extent the ground on each side thereof.

In the operation of my device, sufficient forward speed must be developed fully to accomplish the purposes thereof. At low speed, the wheels of the automobile will not throw up sufficient debris to cause the obscuration complained of. But at the development of greater speeds, sufficient ambient air is picked up by the air intakes 12 and 13 and inducted into the channels of the air flow conduits 10 and 11, to cause high pressure and flowage of air through said channels to impinge downwardly through the jet nozzles 27 upon the road so as to guard against and prevent the upward thrust pressure of mud, water, road oils and other debris brought about by the rotating wheels and forward motion of the vehicle. Accordingly, through the use of my improved device, any immediately following motor vehicles will be spared from the objectionable matter thrown into the air through the usual operation of the car in front. By sucking the gases from the exhaust pipe, there will be effected a faster and cooler running of the motor. The regulator valves 28 at the divergent nozzles 27 can be adjusted to prevent scattering of debris and to prevent the usual dust storm at the rear of the vehicle.

My invention may be embodied in other specific forms without departing from the spirit or essential characteristics thereof. The present embodiment as above set forth is therefore to be considered in all respects as illustrative and not restrictive, the scope of my invention being indicated by the appended claims rather than by the foregoing description, and all changes which may come within the meaning and range of equivalency of the claims are therefore intended to be embraced therein.

What I claim and desire to secure by Letters Patent is:

1. In an automotive vehicle having rear wheels and a motor in a motor compartment and having an exhaust pipe: a conduit having a ram air intake at the front of the vehicle and a rear end portion immediately behind the corresponding rear wheel; a downwardly directing jet air flow dispenser on said rear end portion of said conduit; said dispenser having multiple nozzles, said nozzles being downwardly divergent, whereby an apron of downwardly directed air prevents rise of dust and other material otherwise kicked up by said rear wheels; a motor cooling tube having a forward open end adjacent to said motor and leading from the motor compartment rearwardly into said conduit, whereby said motor compartment is cooled and a branch exhaust pipe connecting the first mentioned exhaust pipe with said conduit, whereby back pressure on said motor is reduced.

2. Apparatus according to claim 1 and including an enlarged chamber constituting a pressure accumulator in a portion of said dispenser adjacent said conduit, each of said nozzles having a regulator valve therein for individual control of said nozzles.

References Cited in the file of this patent

UNITED STATES PATENTS

| | | |
|---|---|---|
| 732,710 | Cauzard | July 7, 1903 |
| 880,739 | Johnson | Mar. 3, 1908 |
| 1,447,004 | Anthon | Feb. 27, 1923 |
| 1,867,802 | Bogert | July 19, 1932 |
| 2,231,586 | Miller | Feb. 11, 1941 |

FOREIGN PATENTS

| | | |
|---|---|---|
| 517,514 | France | Dec. 18, 1920 |
| 561,191 | France | July 31, 1923 |
| 1,010,818 | France | June 16, 1952 |
| 3,091 of 1911 | Great Britain | Feb. 7, 1912 |
| 20,297 of 1902 | Great Britain | Sept. 17, 1903 |
| 22,052 of 1907 | Great Britain | July 30, 1908 |
| 26,078 of 1905 | Great Britain | Dec. 13, 1906 |